Nov. 5, 1946.  E. BARANY  2,410,562
FRUIT JUICE EXTRACTOR
Filed Jan. 4, 1945

INVENTOR.
Edmund Barany
BY Hastings W. Baker

Patented Nov. 5, 1946

2,410,562

UNITED STATES PATENT OFFICE 2,410,562

FRUIT JUICE EXTRACTOR

Edmund Barany, Syracuse, N. Y.

Application January 4, 1945, Serial No. 571,263

3 Claims. (Cl. 146—3)

The object of the invention is to provide a novel and useful fruit juice extractor whereby the juice will be extracted from a half fruit merely by pressing the half fruit against the extractor.

Another object of the invention is to provide a rotatable head with spiral ribs whereby the ribs bore into the fruit in much the same fashion as an auger, the head being rotated merely by applying pressure to the head.

Another object is to provide a combined head and juice receptacle detachably mounted on the other parts of the mechanism so that the receptacle may be simply lifted off of the support therefor when it is desired to empty the extracted juice. In devices heretofore suggested in which the rotatable ribbed head is separate from the juice receptacle, juice will pass between the head and receptacle and into the working parts of the mechanism, making thorough cleaning difficult. By my improved construction all working parts are shielded from the juice except those parts intended to contact the fruit or juice.

Another object of the invention is to provide a sanitary, easily washed extractor, simple in construction, durable and highly efficient.

Other objects and advantages of the invention will appear in the detailed specification and claims which follow.

Figure 1:
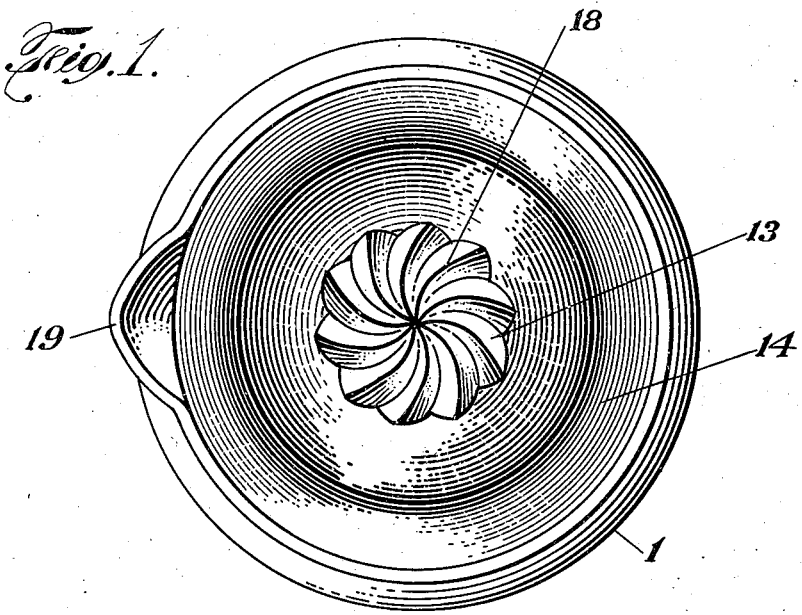
Figure 2:
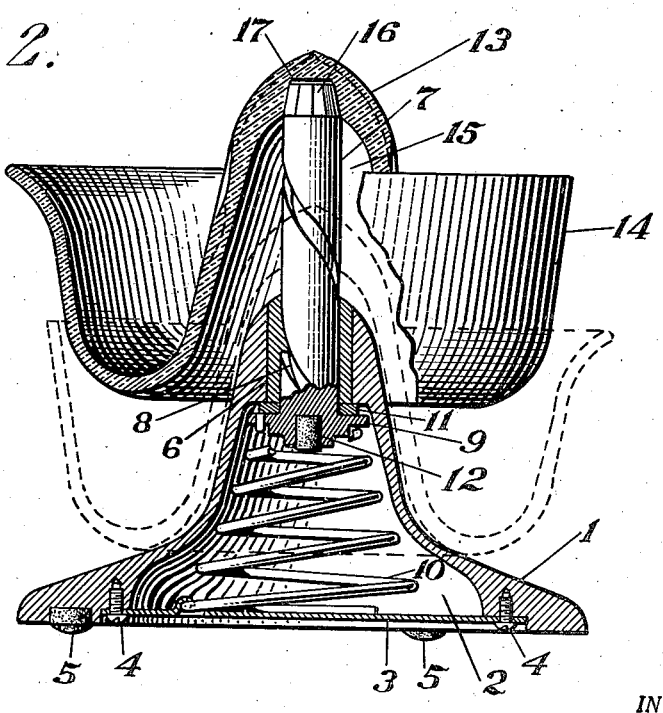

The invention may be better understood by reference to the drawing in which I have shown a preferred embodiment thereof in which Fig. 1 is a plan view thereof, and Fig. 2 is an elevational view, largely in cross-section so as to show the interior construction.

The base 1 has a downwardly flaring hollow interior 2 closed by a plate 3 secured thereto by attaching means 4. It is provided with felt pads 5 so as not to scratch a table or other support. A nut 6 secured in the upper portion of the base receives a plunger 7, there being a spiral tongue and groove connection 8 between the plunger and nut. The plunger 7 extends through the nut 6 into the upper portion of the hollow 2 and is provided with a flange 9. A coiled, conical spring 10 has its lower end secured to the plate 3 and its upper end secured to the flange 9 of the plunger 7 so that as the plunger is depressed and is rotated by the spiral tongue and groove connection 8, the spring 10 will be collapsed as well as wound up so that when the pressure on the plunger is released the spring will return the plunger to its elevated position. The flange 9 limits the upward movement of the plunger and a shock absorber 11 is interposed between the flange 9 and the nut 6. Another shock absorber 12 is carried by the lower end of the plunger 7 to cushion its impact with the plate 3 in case the plunger is moved down sufficiently to contact the plate 3.

A combined head 13 and receptacle 14 is provided with a conical hollow interior 15 so as to receive the plunger 7. The upper end of the plunger 7 is provided with a series of flat sloping surfaces 16 which mate with similar surfaces in the recess 17 in the head 13 which recess 17 opens into the interior 15. By means of such a construction the head 13 and receptacle 14 may be lifted from the plunger 7 when it is desired to empty the receptacle. The head 13 is provided with spiral ribs 18 and the receptacle 14 is provided with a pouring spout 19.

When a half fruit is pressed against the head 13 having the spiral ribs 18, the head 13, receptacle 14 and plunger 7 are depressed, which movement causes these parts to rotate because of the tongue and groove spiral connection 8 between the plunger 7 and the stationary nut 6. This causes the spiral ribs 18 of the head to rotate relative to the fruit pressed by the hand of the operator against the head, and the spiral ribs bore into the fruit in much the same manner as an auger operates, thereby quickly and thoroughly extracting the juice, the coil spring 10 being collapsed and wound up during this operation. Upon releasing the fruit from the head, the spring returns the plunger, head and receptacle to their elevated positions. It should be particularly noted that with such a construction no juice can get to the interior mechanism.

Having now described the preferred form of my invention, I desire to claim the same broadly, except as I may limit myself in the following claims.

I claim:

1. In a fruit juice extractor, a base having a hollow downwardly extending interior, a plate closing the lower end of said hollow, a plunger, a coiled conical spring having one end secured to said plate and the other end secured to said plunger, means whereby the plunger is mounted in the base so as to rotate relative to the base when pressure is applied to the plunger so as to depress it, said spring being wound up and depressed when the plunger is depressed and serving as a means to return the plunger to its elevated position when the pressure is released and a ribbed head mounted on said plunger.

2. In a fruit juice extractor, a hollow base, a plate covering the lower end of the hollow of said base, a nut carried by said base, a plunger mounted in said nut and provided with a flange below the nut so as to limit the upward movement of the plunger relative to the nut, a spiral tongue and groove connection between said nut and plunger so that when the plunger is depressed, it will be rotated relative to the nut and base, a spring in the hollow of said base and having its ends secured to said plate and plunger respectively and tending to maintain said plunger in its elevated position, a ribbed head detachably secured to the upper end of said plunger so as to rotate therewith, and a shock absorber interposed between the nut and flange.

3. In a fruit juice extractor, a hollow base, a plate covering the lower end of the hollow of said base, a nut carried by said base, a plunger mounted in said nut and provided with a flange below the nut so as to limit the upward movement of the plunger relative to the nut, a spiral tongue and groove connection between said nut and plunger so that when the plunger is depressed, it will be rotated relative to the nut and base, a spring in the hollow of said base and having its ends secured to said plate and plunger respectively and tending to maintain said plunger in its elevated position, a ribbed head detachably secured to the upper end of said plunger so as to rotate therewith, and a shock absorber interposed between the nut and flange, and a shock absorber interposed between the plunger and plate.

EDMUND BARANY.